(12) United States Patent
Kogan

(10) Patent No.: US 9,131,396 B2
(45) Date of Patent: Sep. 8, 2015

(54) MEASUREMENT OF FIELD RELIABILITY METRICS

(71) Applicant: AT&T Intellectual Property I, LP, Atlanta, GA (US)

(72) Inventor: Yaakov Kogan, Morganville, NJ (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 376 days.

(21) Appl. No.: 13/653,368

(22) Filed: Oct. 16, 2012

(65) Prior Publication Data

US 2014/0105030 A1    Apr. 17, 2014

(51) Int. Cl.
 *H04W 24/04*    (2009.01)

(52) U.S. Cl.
 CPC .................................... *H04W 24/04* (2013.01)

(58) Field of Classification Search
 CPC .................................................. H04W 24/04
 See application file for complete search history.

(56) References Cited

U.S. PATENT DOCUMENTS

| | | | |
|---|---|---|---|
| 7,088,677 B1 * | 8/2006 | Burst, Jr. ....................... | 370/229 |
| 7,975,187 B2 | 7/2011 | Kogan et al. | |
| 2002/0143920 A1 * | 10/2002 | Dev et al. ...................... | 709/223 |
| 2007/0115849 A1 * | 5/2007 | Ekelin et al. ................... | 370/252 |
| 2009/0013383 A1 * | 1/2009 | Dec et al. ........................ | 726/4 |
| 2010/0034177 A1 * | 2/2010 | Santhanam .................... | 370/338 |

OTHER PUBLICATIONS

Atis, "Mean Time Between Outages—A Generalized Metric for Assessing Production Failure Rates in Telecommunications Network Elements", Aug. 6, 2012.
Chen, "Small Cells and the Future of Wireless", Jul. 31, 2012.
Koga , "Extending Reliability Metrics to Support Evolving Telecommunications Architectures", Jul. 24, 2012.

* cited by examiner

*Primary Examiner* — Siming Liu
(74) *Attorney, Agent, or Firm* — Guntin & Gust, PLC

(57) ABSTRACT

A system that incorporates teachings of the subject disclosure may include an access segment of a mobility network in which routers receive network traffic data from base transceiver stations, forward the network traffic data by way of aggregation routers, originate probe packets directed to a targeted one of the base transceiver station and the aggregation router to determine, by way of an expected reply to each probe packet, reachability of the targeted one of the base transceiver station or the aggregation router. A change from reachability to unreachability of the targeted one of the base transceiver station or the aggregation router is determined to be an indication of service impacted outage. Determined service impacted outages are logged. Reliability metrics, such as average uptime, are computed from reachability status to quantify the impact of service level outages perceptible by the mobile communication devices. Other embodiments are disclosed.

17 Claims, 4 Drawing Sheets

100

200

MEASUREMENT OF FIELD RELIABILITY METRICS

FIELD OF THE DISCLOSURE

The subject disclosure relates to measurement of field reliability metrics associated with the delivery of services to wireless communications devices.

BACKGROUND

Telecommunications infrastructure used to provide wireless voice and data services to subscribers generally includes a radio access network providing an air interface to wireless mobile communications devices, such as cell phones, tablet computers and the like. With the ongoing transition to the long term evolution (LTE) system, service provision is being expanded beyond voice calls towards a multiservice air interface. LTE is designed with the goal of evolving the radio access technology under the assumption that all services would be packet-switched, rather than following the circuit-switched model of earlier systems.

BRIEF DESCRIPTION OF THE DRAWINGS

Reference will now be made to the accompanying drawings, which are not necessarily drawn to scale, and wherein.

DETAILED DESCRIPTION

Figure 1:
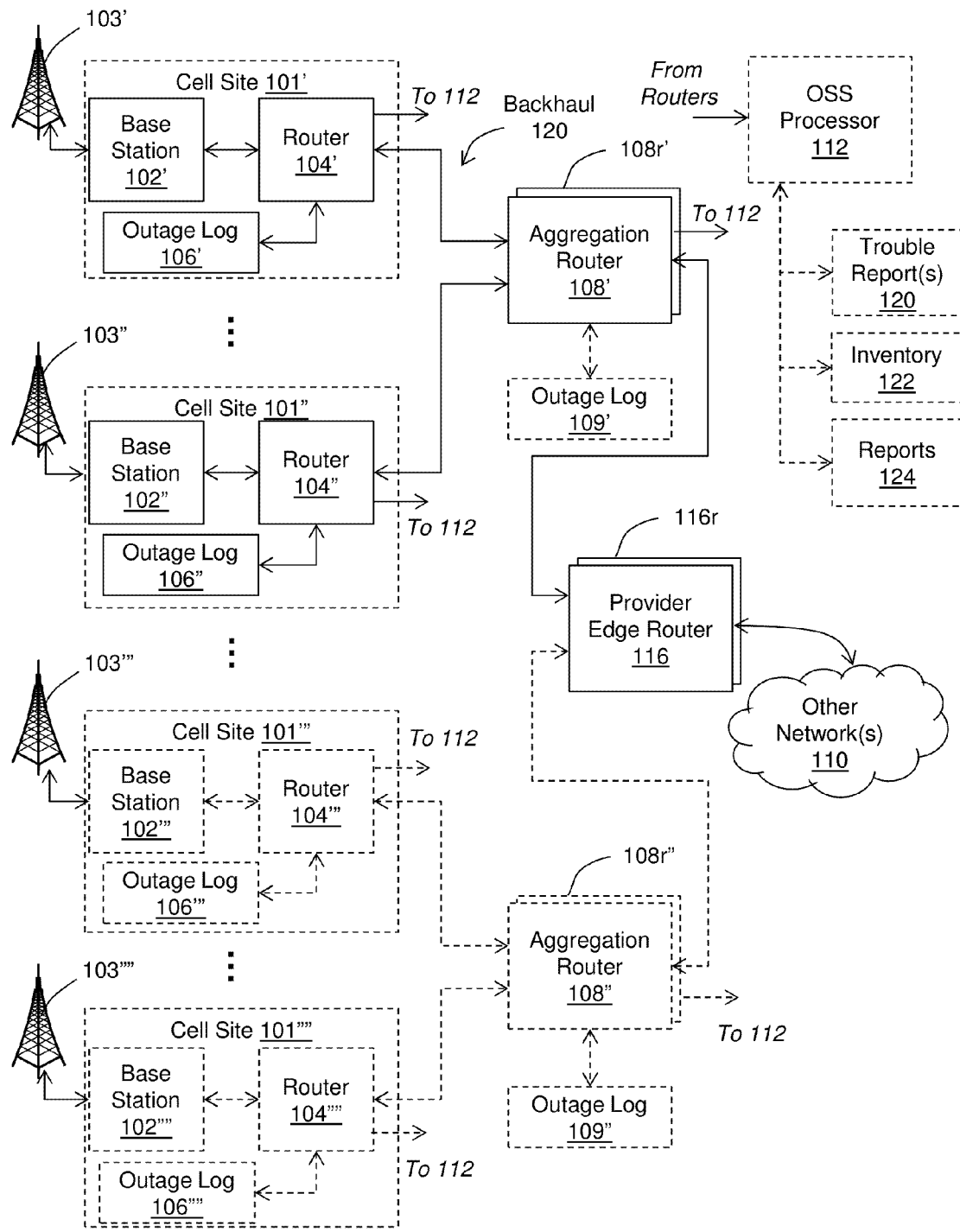
FIG. 1 depicts a functional block diagram of an illustrative embodiment of a portion of a wireless communications network.

The subject disclosure describes, among other things, illustrative embodiments of techniques for determining field reliability metrics related to the delivery of services to mobile communication devices. In some embodiments, one or more network elements, such as routers, conveying network traffic data between a provider network and the mobile communication devices are also configured to generate probe packets, or pings, directed to targeted ones of base transceiver stations or other network elements, e.g., aggregation routers, in order to determine reachability of the targeted devices. Such techniques providing reachability status allow for active monitoring of network elements without requiring additional servers and/or redundant network elements, such as shadow routers.

Reliability metrics, such as average uptime, can be computed from reachability status to quantify the impact of service level outages perceptible by the mobile communication devices. Reachability status of individual network elements and segments of a network can be combined to provide a comprehensive assessment of reliability for the network or segments thereof. Moreover, application-relevant measures of system reliability can be determined using the periodic probing techniques disclosed herein, as the probes can be designed to detect service level outages. Other embodiments are included in the subject disclosure. Such metrics can be based on periodic measurements to determine reachability of one or more network elements. A lack of reachability, or unreachability for one or more of the network elements can be interpreted as resulting in a service level impact.

One embodiment of the subject disclosure includes an Internet Protocol (IP) router including a memory configured to store computer instructions and a processor coupled to the memory. The processor, responsive to executing the computer instructions, performs operations including receiving network traffic data from a base transceiver station and forwarding the network traffic data by way of an aggregation IP router. The aggregation IP router receives similar network traffic data from a number of other base transceiver stations by way of a number of other IP routers. The processor also performs operations including originating a number of probe packets directed to a targeted one of the base transceiver station and the aggregation IP router. Each probe packet has a lower priority than network traffic data so as not to interfere with the forwarding of network traffic data. The probe packets are sent to the targeted one of the base transceiver station and the aggregation IP router to determine the reachability of the targeted one of the base transceiver station and the aggregation IP router. The processor detects, for each probe packet of the number of probe packets, a respective a respective response or failure of the targeted one of the base transceiver station and the aggregation IP router to provide the expected reply as an indication of reachability. The processor detects a change in reachability of the targeted one of the base transceiver station and the aggregation IP router from reachable to unreachable as an indication of a service impacted outage, and records in outage log records the indication of service impacted outage for the targeted one of the base transceiver station and the aggregation IP router.

Another embodiment of the subject disclosure relates to a process that includes receiving, by a cell-site IP router, network traffic data from a collocated base transceiver station and forwarding the network traffic data. A number of probe packets are generated by the cell-site IP router and directed to the collocated base transceiver station. The probe packets are sent by the cell-site IP router to the collocated base transceiver station, from which each probe packet prompts a respective reply. Each probe packet has a lower priority than network traffic data so as not to interfere with the forwarding of network traffic data. For each probe packet, a respective response or failure of the collocated base transceiver station to provide the expected reply is detected as an indication of reachability. The cell-site IP router detects a change in reachability of the collocated base transceiver station from reachable to unreachable as an indication of a service impacted outage. The indication of the service impacted outage for the collocated base transceiver station is recorded in outage log records.

Yet another embodiment of the subject disclosure includes computer instructions which, responsive to being executed by an IP router, cause the IP router to perform operations including receiving network traffic data from a base transceiver station collocated with the IP router. The network traffic data are forwarded by way of an aggregation IP router. The IP aggregation router receives similar network traffic data from a number of other IP routers collocated with other base transceiver stations. A set of probe packets is generated, wherein each probe packet has a lower priority than network traffic data so as not to interfere with the forwarding of network traffic data. The set of probe packets is sent to the aggregation IP router, wherein the aggregation IP router receives the set of probe packets and other sets of probe packets from the number of other IP routers collocated with the other base transceiver stations. Each probe packet of the other sets of probe packets also has a lower priority than network traffic data so as not to interfere with the forwarding of network traffic data. Each probe packet of the set of probe packets and the other sets of probe packets prompts a respective reply from the aggregation IP router. For each probe packet of the set of probe packets a respective response or failure of the aggregation IP router to provide the expected reply is detected as an indication of reachability. A change in reachability of the aggregation IP router from reachable to unreachable is detected as an indication of a service impacted outage. The indication of the service impacted outage is recorded in outage log records at the IP router, wherein indications of service impacted outages are similarly detected and recorded at each of the other IP routers of the number of IP routers collocated with the other base transceiver stations.

FIG. 1 depicts an illustrative embodiment of a portion of a hierarchical wireless communications network 100. The network 100 includes multiple wireless communication, or cell, sites 101', 101", 101'", 101"" (generally 101). The cell sites 101 are arranged to provide wireless communications coverage within a desired geographic region(s). For large service providers, such networks can provide national coverage, including many thousands of such cell sites 101. Each of the cell sites 101 includes at least one antenna 103', 103", 103'", 103"" (generally 103) coupled to a base transceiver station 102', 102", 102'", 102"" (generally 102).

The base transceiver station 102 contains equipment for transmitting and receiving radio signals (transceivers) to/from wireless communication devices, such as mobile cellular telephones, personal data assistants, tablet computers, laptop computers, and the like. In some embodiments, the base transceiver stations 102 also include equipment for encrypting and decrypting communications with a base station controller. In some embodiments, the base transceiver stations 102 receive information from mobile communication devices through an air interface and then convert it to one or more wire line interfaces of a router 104.

A network element, such as an IP router 104', 104", 104'", 104"" (generally 104), sometimes referred to as a cell-site router 104, is associated with one or more of the base transceiver stations 102. In the illustrative embodiments, the routers 104 are IP routers, forwarding IP packets. It is understood that the techniques disclosed herein can be applied generally to any network element of a network layer, such as layer 3 of the OSI model of computer networking. A single IP router 104 can be associated with one base transceiver station 102 (e.g., a single eNodeB), or with a relatively small group of such base transceiver stations 102 (e.g., several NodeBs). In some embodiments, the IP router 104 is collocated with the associated base transceiver station 102, as suggested by the boundary of the cell site 101 (shown in phantom). Alternatively or in addition, one or more of the IP routers 104 can be remote from the base transceiver station 102, such that each IP router 104 is adjacent to its associated base transceiver station 102, at least in a network sense. For example, the IP router 104, whether physically collocated with the base transceiver station 102 or not, is a first router encountered by network traffic data, e.g., IP packets, received from the base transceiver station 102.

In at least some embodiments of the hierarchical wireless communications network 100, as illustrated, at least one network element in common with a group of cell sites 101, communicatively coupled to the group of cell sites 101 through the backhaul network 120. In at least some embodiments, the backhaul network 120 includes an Ethernet switched network, which itself can include a number of routers and/or other network elements. In the illustrative example, the common network element includes an aggregation IP router 108', 108" (generally 108). It is understood that the techniques disclosed herein can be applied generally to any network element of a network layer, such as layer 3 of the OSI model of computer networking. A first aggregation IP router 108' is configured such that it switches substantially all network traffic data to and from each of a first group of cell sites 101'-101". In some embodiments, more than one group of cell sites are similarly coupled to a respective aggregation IP router. In the illustrative example, a second group of cell sites 101'"-101"" is communicatively coupled through a second aggregation IP router 108".

In some embodiments, each of the one or more aggregation IP routers 108 can also serve as a provider edge router, switching traffic between the cell sites 101 and other networks, 110. Alternatively or in addition, one or more aggregation IP routers 108 can be further aggregated under a provider edge IP router 116. For example, each of a group of aggregation IP routers is coupled to a common provider edge router 116, as shown in the illustrative example. Network traffic data to and from the each group of cell sites can thus be directed through the respective aggregation IP router 108, and further through the provider edge IP router 116. The provider edge IP router provides access to the one or more other networks 110 through which respective network addressable entities can be reached. The network between the cell sites and the provider edge router, is sometimes referred to as a production network, carrying production network traffic data to and from wireless service subscribers. Such network addressable entities can include originators and/or providers of networked services, such as multimedia services, and/or voice communications services, and or data communications services. One or more of the network aggregation elements 108, 116 can be provided with redundancy. In redundant configurations, routers 108, 116 are deployed in pairs. In the illustrative example in FIG. 1, each of the aggregation IP routers 108', 108" is respectively paired with a redundant aggregation IP router 108r', 108r" (generally 108r). Network traffic packets from/to each base transceiver station are routed through one active router of the of the aggregation pair of IP routers 108 and 108r, while the other aggregation IP router of the redundant pair is in a standby state for that base transceiver station. In general, one router 108 of the pair of redundant routers 108, 108r could be active for approximately half of base transceiver stations 102 connected to the pair, while the other router 108r of the pair could be active for the remaining half of base transceiver stations 102 connected to the pair 108, 108r. In the event of an active router failure, or as part of routine operation maintenance, traffic is "failed over" from the active router to the standby router. In the illustrative embodiment, the provider edge router 116 is similarly paired with a redundant provider edge router 116r.

In the illustrative embodiment, each IP router 104 of a first group of IP routers 104', 104" associated with or otherwise located in a respective cell site 101 of a first group of cell sites 101', 101" is communicatively coupled to a first aggregation IP router 108'. Likewise, each IP router 104 of a second group of IP routers 104'", 104"" associated with or otherwise located in a respective cell site 101 of a second group of cell sites 101'", 101"" is communicatively coupled to a second aggregation IP router 108". Each of the first and second aggregation IP routers 108', 108" is communicatively coupled to a common provider edge IP router 116, providing access to one or more other networks 110 through which respective network addressable entities can be reached.

Each of the IP routers 104 associated with a base transceiver station 102 includes a respective memory adapted or otherwise available for storing information related to the reachability of probe packets directed to one or more of the associated base station 102 and the aggregation IP router 108. Such information is referred to generally herein as an outage log 106', 106'', 106''', 106'''' (generally 106). Alternatively or in addition, the aggregation IP router 108 also includes a memory for storing information related to the reachability of probe packets originated by the aggregation IP router 108 and directed to the provider edge router 116, again referred to generally herein as an outage log 109', 109'' (generally 109).

A processor, such as an operational support system (OSS) processor 112 can be provided in at least some embodiments. The OSS processor 112 can be in network management communication with one or more of the aggregation IP router 108 and the IP routers 104 associated with the base transceiver stations 102, such that reachability information, as may be stored in the outage logs 106, 109, can be periodically collected (polled e.g., once per day) and further processed. Such processing can include generation of periodic reports 124 for a variety of production (field) reliability metrics, such as generalized uptime, mean time between outages (MTBO), defects per million (DPM) based on processing of collected outage logs data 106, 109 and correlation of detected unreachability events with existing trouble reports (tickets) 120 as discussed herein or otherwise generally known to those familiar with such techniques for monitoring networks.

The provider edge IP router 116, in some sense, provides a second level of aggregation. The provider edge IP router 116 is configured such that substantially all network traffic data to and from each of the first level aggregation IP routers 108', 108'' (and aggregated traffic to/from the IP routers 104, associated with the base transceiver stations) is routed through the provider edge IP router 116. In some embodiments, each aggregation IP router 108 can be configured to aggregate network traffic data to/from a large number of IP routers 104 associated with base transceiver stations 102. Likewise, provider edge IP router 116 can be configured to aggregate network traffic data to/from many aggregation IP routers 108, such that the provider edge IP router 116 aggregates network traffic data to/from hundreds of cell sites 101.

Figure 2:
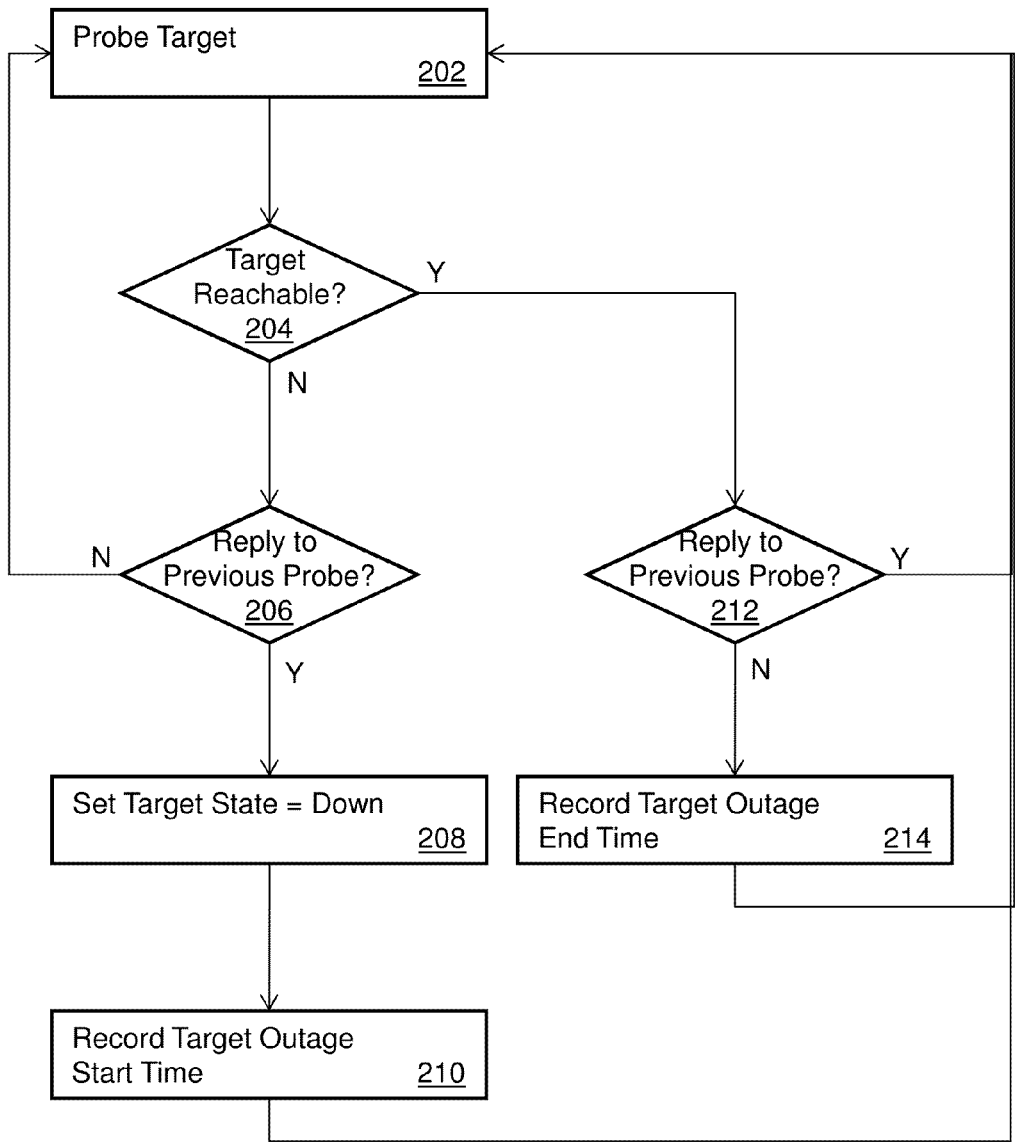
FIG. 2 depicts a flow diagram of an illustrative embodiment of a process operating in portions of the systems described in FIG. 1 and FIG. 3.

FIG. 2 depicts an illustrative embodiment of an outage detection process 200 used by one or more network elements, such as the IP routers 104, the aggregation IP routers 108 of the hierarchical wireless communications network 100 (FIG. 1). The outage detection process 200 presumes that reachability status of the target device, e.g., the base transceiver station 102 or the aggregation IP router 108, or the provider edge IP router 116 is in one of two states: "up" or "down" when it is respectively reachable or unreachable by probe packets. The state "down" is interpreted as service outage.

A network element, such as the IP router 104 associated with the base transceiver station 102 generates probe packets at 202 directed toward a targeted one of the base transceiver stations 102 or the aggregation IP router 108. The probe packets can be structured as part of a messaging protocol. For example, the probe packet can include an originating or packet source address field, such as an IP address of the originating router 104, 108. The probe packets can also include a destination address field, for example, an IP address of the targeted device, as well as a message type field, or other fields suitable for requesting or otherwise prompting a response from the targeted device 102, 108. The targeted device 102, 108 receives the probe packet and interprets it as a packet type requiring a response, send a suitable response or reply to the probe originating IP router 104.

The probe originating IP router 104, determines whether the targeted device 102, 108 is reachable at 204. The IP router 104 originating the probe packet can conclude that the targeted device is reachable by recognizing a response to the probe packet. Otherwise, the IP router 104 can conclude that the targeted device is unreachable by a lack of a reply to the probe packet within an expected reply period. If the probe originating IP router 104 determines that the targeted device 102, 108 is unreachable, then the IP router 104 next checks at 206 whether the targeted device replied to a preceding probe packet and determines whether the first "down" state is occurred after one or more of "up" states.

To the extent that the targeted device 102, 108 was in a down state at 206 (unavailable—no reply received to previous probe), another probe packet is sent to the target at 202 and the process 200 is repeated. To the extent, however, that the targeted device 102, 108 was in an up state at 206 (reachable—reply received to previous probe), an updated operational state of the target device 102, 108 is set to "down." The occurrence of a target being unreachable to a given probe packet following the same target being reachable to an immediately preceding packet is in indication that an outage has occurred sometime between the two probe packets. A start time for the detected outage is recorded at 210 in the local outage log 106 at the probe originating IP router 104. Another probe packet is sent at 202 and the process 200 is repeated.

To the extent that the targeted device 102, 108 was reachable at 204 the IP router 104 next determines at 212 whether the targeted device replied to a preceding probe packet. To the extent that the targeted device 102, 108 was in an "up" state at 212 (reachable—reply received to previous probe), another probe packet is sent at 202 and the process 200 is repeated. To the extent, however, that the targeted device 102, 108 was in a "down" state at 212 (unavailable—no reply received to previous probe), an updated operational state of the target device 102, 108 is set to "up." The occurrence of a target being reachable to a given probe packet following the same target being unreachable to an immediately preceding packet is in indication that an outage has ended sometime between the two probe packets. An end time for the detected outage is recorded at 214 in the local outage log 106 at the probe originating IP router 104. Another probe packet is sent at 202 and the process 200 is repeated, detecting start and end times for other service level outages.

In at least some embodiments, the probe originating IP router generates such probe packets, implementing the outage detection process 200 for more than one targeted device. For example, the IP router 104 can generate a first set of probe packets directed to a first target represented by the base transceiver station 102. The first set of probe packets are processed according to the outage detection process 200. The same IP router 104 can generate a second set of probe packets directed to a second target represented by the aggregation IP router 108. The second set of probe packets are also processed according to the outage detection process 200. In at least some embodiments the first and second sets of probe packets are not synchronized and, in general, performed on a different time scale, for example, measured by seconds and minutes for targeted device 102 and 108 respectively. The same IP router 104 can monitor outages on more than one targeted device (e.g., 102, 108) during prescribed time intervals, respectively recording outage start and end times for each of the targeted devices 102, 108. In at least some embodiments, an aggregation IP router 108 generates probe packets directed to the respective provider edge IP router 116, and the aggregation IP router 108 implements the outage detection process 200 where the target is router 116. An outage can be similarly determined according to reachability of the provider edge IP router 116.

An example of a log 106 is provided in Table 1 below. A determination can be made at 206 (FIG. 2) that a down state resulting from base transceiver station BTS_A (e.g., as identified by its IP address) being unreachable was first encountered, for example, beginning on Aug. 4, 2011 at 12:35:32 (hours:minutes:seconds). In at least some embodiments, an identifier of each device being reported, such as a network or IP address is also recorded along with any outage information. The first table entry can be logged at 210 (FIG. 2), logging particulars of the beginning of the outage. A further determination can be made at 212 (FIG. 2) that base transceiver station BTS_A transitioned to an up state, becoming reachable again, for example, on Aug. 4, 2011 at 12:36:32. The second table entry can be logged at 214 (FIG. 2), logging particulars of the end of the outage. The duration of the outage can be determined as a difference in time between the end and start times of the outage, e.g., 4 minutes. In at least some embodiments, the duration of the outage is determined by the packet originating device and also recorded in the operational status log. Alternatively or in addition, such determinations of duration of outage can be determined by the OSS processor 112 (FIG. 1). Similar determinations can be made using the process 200 for probe packets originated at each of the IP routers 104 and sent to a common aggregation router 108. Example entries of Table 1 indicated that a service level outage was experienced by aggregation router AGR_B, starting on Aug. 4, 2011 at 14:35:32 and ending on Aug. 4, 2011 at 14:38:38, for a duration of 3 minutes and 6 seconds.

TABLE 1

Operational Status Log

| Device | Start Time | End Time | State Change/Status |
|---|---|---|---|
| BTS_A | Aug 4 11:12:35:32 | — | UP → DOWN |
| BTS_A | — | Aug 4 11:12:36:32 | DOWN → UP |
| AGR_B | Aug 4 11:14:35:32 | — | UP → DOWN |
| AGR_B | — | Aug 4 11:14:38:38 | DOWN → UP |

Such logs are stored in a memory accessible by the respective reporting device, such as any of the IP routers 104, 108 during relatively short time period (e.g., one day) before they are collected by a centralized server, such as the OSS processor 112 (FIG. 1) for long term storing (e.g., up to one year) and additional processing. Such additional processing can include preparation of summary reliability reports 124 and statistics as can be stored in an accessible memory or otherwise disseminated by the OSS processor 112.

In some embodiments, an originating IP address field within the probe packet is necessary so that a targeted aggregation IP router 108 can determine a destination for the reply. In the illustrative example, the probe packet as well as any reply is routed over the backhaul network 120, which itself can include one or more routers or other networking elements. It is understood that in at least some embodiments, such as probe packets between the IP router 104 and its associated base transceiver station 102 need not include IP addresses, if 102 is the only base transceiver station and it directly connected to router 104, without any intervening network elements.

In at least some embodiments, the probe packets are assigned a relatively low priority, such that they avoid interfering with other network traffic data. One such class of probe packets is generally known as "pinging." In contrast with pinging generated from outside of a service provider Mobility network and that can be perceived as denial of service (DOS) attack, the probe packets are generated by insider routers which can process prompted responses from targeted devices. At least one class of packets configured to prompt such a response is referred to as Echo Reply packets, for example, as in the Internet Control Packet Protocol (ICMP). The echo reply packets are returned to a source IP address of the originating packet, e.g., the IP router 104 associated with the base transceiver station 102.

It should be appreciated that such probe packets can be sent periodically with a respective delay between origination of respective consecutive probe packets that can be constant or variable. For example, a first set of periodic packets can be originated and sent to the associated base transceiver station 102 with consecutive packets separated by a constant delay $d_1$. This delay period can be selected according to requirements of a particular service, such as streaming video and/or audio. It is understood that an interruption to delivery of such streaming media packets, e.g., loss of packets, can result in service-level outages experienced by users of the service. Namely, a subscriber of a streaming media service delivered over the hierarchical wireless communications network 100 will experience an interruption of service for outages encountered by any network devices along a network path between a provider edge and the base transceiver station serving the subscriber's wireless communications device at that time.

It is common for streaming video protocols to provision a buffer for storing at least some content delivered by a streaming video service to accommodate for certain delays and/or dropouts. However, such buffers typically have a small size or buffer depth measured by delay with start of the video at the user device (e.g., iPhone) which must be short enough for real-time video. Consequently, any outages extending beyond a time period greater than the streaming video buffer depth (e.g., up to 3 seconds of real-time streaming video), will result in an interruption of service. In the streaming video example, consecutive probe packets are separated by a delay $d_1$ of less than 3 seconds, and preferably of 1 second.

In at least some embodiments, a second set of periodic packets can be originated by the IP router 104 and sent to the associated aggregation IP router 108 with consecutive packets separated by a second maximum delay period, $d_2$. This delay period $d_2$ can be selected according to a particular service, such as streaming video and/or audio media, but take into consideration that similar packets are being sent to the same aggregation IP router 108 from many other IP routers 104 associated with that aggregation IP router 108.

Since a lack of reply from the aggregation router 108 to a probe packet originated and sent from any one of many routers 104 would provide an indication that the aggregation IP router 108 is unreachable to service network traffic data, a maximum tolerable time period or delay $d_2$ between consecutive probe packets from any one of the aggregated IP routers 104 can be relaxed, such that $d_2 \gg d_1$ assuming that the start time of probe packets is asynchronously selected at each router 104 associated with the same aggregation router 108. In at least some embodiments there is a large number k of routers 104 (e.g., k is in the range of 10 to 100 or more) associated with the same aggregation IP router and then the maximum tolerable delay between consecutive probe packets of the second set of probe packets can be approximated as k times the first tolerable delay, e.g., $d_2 \approx d_1 * k$.

It is preferable that the second sets of probe packets from routers 104 associated with the same aggregation IP router 108 are distributed substantially evenly in time, such that delay between consecutive packets in the total stream of probe packets to the aggregation router 108 is of the order of $d_1$. One way to ensure this occurs it to prescribe a respective start time for each router 104 to send its respective first probe packet, with each consecutive probe packet separated by a duration of about $d_2=d_1*k$. Alternatively, each router 104 can be provisioned to transmit its respective second set of probe packets at a similar rate, but asynchronously with respect to other routers 104 aggregated under the same router 108. For example, the probe packets can be sent according to a generated random number such that each probe packet has substantially the same likelihood as occurring anywhere within the delay window $d_2=d_1*k$.

It is understood that in at least some hierarchal networks 100, a redundancy is provided to enhance network reliability. In at least some embodiments, each IP router 104 is connected by two virtual circuits in active/standby configuration to respective aggregation routers 108 and 108r. The router 104 sends probe packets over the active virtual circuit to the respective active aggregation IP router 108. If the active router 108 fails and the failure is detected by the fault management system then the network traffic data as well as probe packets will successfully fail over to the virtual circuit connected to the redundant router 108r and the probe packets will be not lost for a detectable time period. However, probe packets will be lost if the failure of active router 108 is not detected or the traffic does not failover to the redundant virtual circuit connected to the aggregation router 108r (so called black-hole condition). Thus the IP router 104 logs any service impacted outages that results in loss of probe packets along the path between routers 104 and the pair of aggregation IP router 108, 108r. As part of a scheduled process, the OSS processor 112 periodically collects from each of the network elements 104, 108 its respective outage log 106, 109. For example, such information may be obtained daily, or weekly or by some other suitable schedule. Such information to be obtained over a management network which is separate from the production network. Such a management network used in the illustrative embodiment of FIG. 1, for collecting by the OSS processor 112 outage log information 106, 109 from the network elements 104, 108. Calculations of field reliability metrics require inventory information 122 or database. Inventory information 122 can include the number of base transceiver stations 102 in production, the number of base transceiver stations 102 per each interface, or access line card, of each aggregation IP router 108, the number of aggregation IP routers 108 connected to each interface, or access line card of each provider edge router 116 and the total number of access line cards in the aggregation IP routers 108 and provider edge routers 116. Such an inventory can also identify network addresses, such as IP addresses, for each of the inventoried devices.

As part of the processing, any duplicated records of outages (e.g., the same outage of router 108 can be recorded by many routers 104) are removed and the actual outage times (downtimes) are determined by the OSS processor 112 by comparing outage records from the plurality of logs 106, 109 and against trouble reports 120. This comparison can be used to correlate outages to separately detected and/or earlier reported issues. The OSS processor 112 can further process such information and generate summary reports 124 providing field reliability metrics, such as uptime, meantime between outages (MTBO), and defects per million (DPM), as disclosed herein or otherwise understood by those familiar with characterizing network field reliability.

Some example calculations include mean time between outages (MTBO) for base transceiver stations 102. Such an MTBO can be calculated as a total number of base transceiver stations 102 multiplied by an observation time period and divided by the total number of base transceiver station outages registered by all routers 104 during that time period. An MTBO for aggregation IP routers 108 and the backhaul network 120 can be calculated as a total number of access line cards for all aggregation routers 108 multiplied by an observation time period and divided by the total number of service impacted outages of routers 108 during that time period as determined by OSS processor 112 based on respective outage logs 106 collected from all cell-site routers 104. Similarly, an MTBO for a provider edge router 116 can be determined as a ratio of a total number of access line cards for all provider edge router 116 multiplied by an observation time period and a total number of service impacted outages of routers 116 during that time period as determined by OSS processor 112 based on respective outage logs 109 collected from all aggregation routers 108.

In at least some embodiments, additional processing is applied to cell-site router logs 106 and aggregation router logs 109 to determine combined reliability metrics indicative of outages experienced by subscribers of network services over a reporting period. In such calculations, a weighting value can be applied to a measure of reliability for each probed device 102, 108, 116. For example, a measure of uptime or downtime for a base transceiver station 102 (as measured by associated with it router 104) can be weighted by a value of "1"; whereas, a similar measure of uptime or downtime for an aggregation IP router 108 whose outage can impact many routers 104 and associated with them base transceiver stations 102 can be weighted or otherwise scaled by a value of K equaled to the number of impacted base transceiver stations 102. This signifies that an outage associated with a single cell-site IP router 104 will result in an interruption of service to the corresponding cell site 101, without impact to any of the other cell sites. An outage associated with one of the aggregation IP routers 108, however, will result in an interruption of service to the K cell sites 101 being serviced through the aggregation IP router 108. A similar scaling value can be applied to the provider edge router 116, for example, scaling by a factor of N (N>>K), representing the total number of base transceiver stations that can be impacted by an outage of the provider edge router 116.

The results can be combined in a single metric which is referred to as generalized uptime. For example, the equation below, provides a generalized uptime U for the multi-level aggregating hierarchical wireless communications network 100, in which $U_1$ is an average uptime of the base transceiver stations, $U_2$ is an average uptime of the aggregation IP routers 108, and $U_3$ is an average uptime of the provider edge IP routers 116:

$$U = \frac{1}{\left(\frac{1}{U_1} + \frac{K}{U_2} + \frac{N}{U_3}\right)}$$

The downtimes $D_2$ and $D_3$ for aggregation and provider edge routers 108 and 116 are multiplied by K and N respectively and calculated as $KD_2$ and $ND_3$. Similarly weighted downtimes are used in the numerator of the defects per million (DPM) metric which is defined by the following ratio multiplied by 1,000,000 (one million). For a given reporting period (with duration in hours), the numerator is a sum with terms calculated as a product of an outage time and the respective number of base transceiver stations impacted for all outages occurred during that period. The denominator is a product of the reporting period duration and the total number of base transceiver stations.

Figure 3:
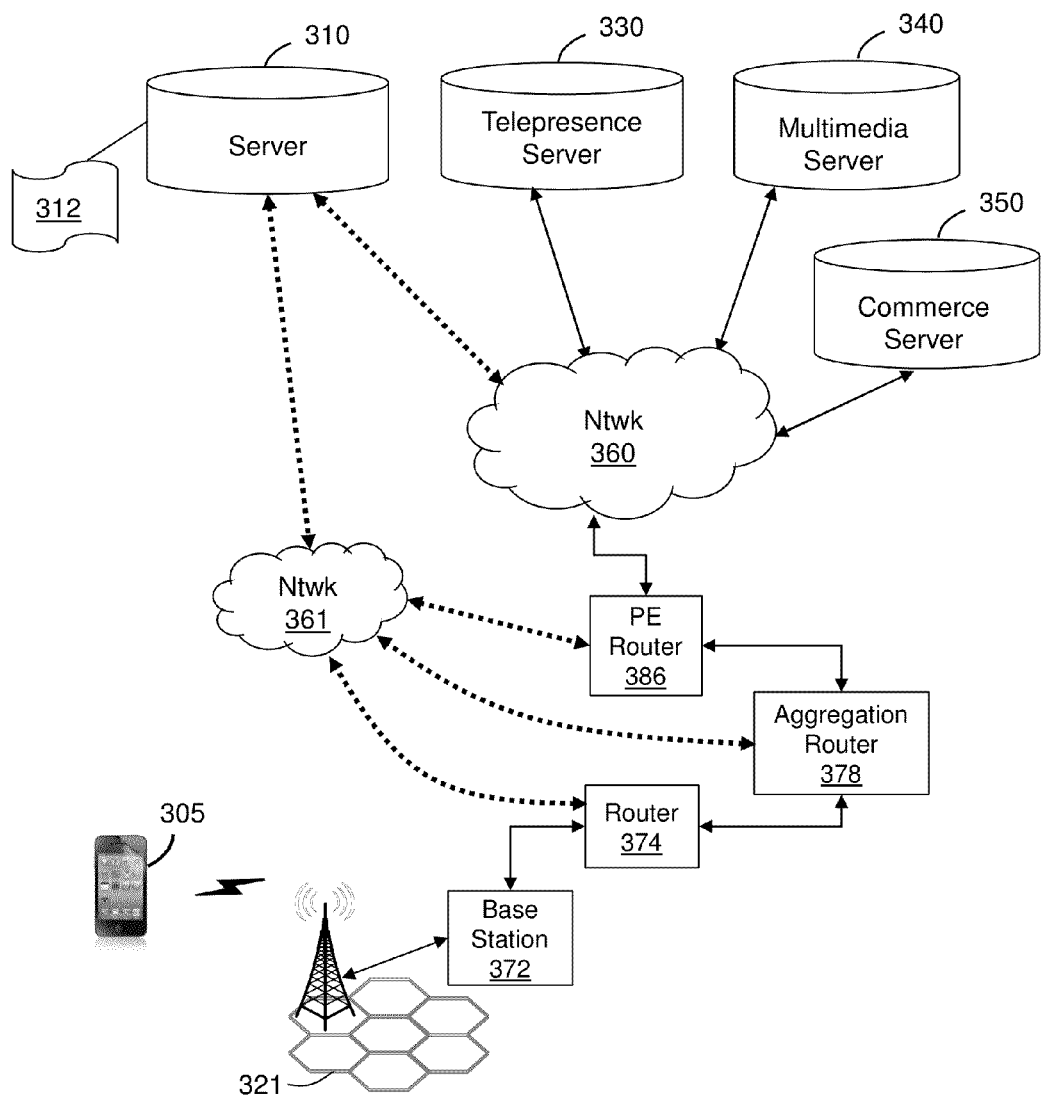
FIG. 3 depicts a functional block diagram of an illustrative embodiment of a communication system that provides media services.

FIG. 3 depicts an illustrative embodiment of a communication system 300 employing a network architecture to facilitate delivery of one or more services to wireless communication devices 305. In some embodiments, a wireless access terminal 321 includes a base transceiver station 372 with a collocated IP router 374 to transfer network traffic data to and from the base transceiver station 372. The IP router 374 together with one or more other IP routers collocated with respective base transceiver stations (not shown) are each in network communication with a common aggregation IP router 378. In some embodiments, the common aggregation 378 is a provider edge router connecting to another network, such as a core network 360. Alternatively or in addition, one or more such aggregation IP routers 378 not serving as provider edge routers, are further aggregated by a common provider edge router 386, in further communication with another network 360, such as a wide area network including the Internet. Each IP router 374 generates periodic probe packets, or probes, directed to a targeted one of its collocated based transceiver station 372 and the common aggregation IP router 378 in order to determine operational status of the targeted device 372, 378. In at least some embodiments, the packets are repeated with a period of not more than a streaming media buffer depth of a mobile communication device coupled to the provider network through the base transceiver station 372. A failure of the targeted device to respond to the periodic packets can be recorded as a service level outage, for example, using the example outage detection process 200 (FIG. 2) disclosed herein.

Various services, such as those provided by a telepresence server 330, a multimedia server 340 or a commerce server 350 can be accessed by the wireless communications device 305, through the production network, a portion of which is represented by the base transceiver station 372, the collocated router 374, the aggregation router 378, and the provider edge router 386. Telepresence server 330 includes services such as video teleconferencing. The multimedia server 340 includes delivery of audio-visual content, such as video on demand. The commerce server 350 includes commercial applications, such as commercial transactions, including wireless point of sale activity that can be particularly sensitive to short term outages. Virtually any service as may be accessed by a packet network, such as the Internet, can benefit from an ability to actively detect outages as disclosed herein. Applications, such as those disclosed herein, are likely to be more susceptible to short term outages that may go undetected by standard network monitoring techniques. Such applications will benefit from the active monitoring techniques particularly adapted to monitor for short term outages.

An example of a management network 361 is also illustrated in communication between the IP routers 374, the aggregation IP routers 378, the provider edge IP routers 386 and the server 310. In the illustrative example, the server 310 can include an OSS application, for example, including the OSS function 360. For example, the software functions 360 can include correlating service level outages with independently derived trouble reports of hardware of software failures. For example, such trouble reports can be provided by vendors and/or operators of portions of the system 100 (FIG. 1), such as the base stations 102, themselves. For example, the software functions 360 can include correlating service level outages with independently derived trouble reports of hardware or software failures. For example, such trouble reports can be provided by vendor's and/or operator's fault management systems of portions of the system 100 (FIG. 1), in particular, the base transceiver stations 102, themselves. In at least some embodiments, the server 310 including the OSS function 360 can be accessed over the network 360.

It is further appreciated that the wireless communication devices 305 can be communicatively coupled to the base transceiver station 372, a femtocell, a WiFi router, a Digital Enhanced Cordless Telecommunications (DECT) base unit, or another suitable wireless access unit to establish communications with the network 360 of FIG. 3. The wireless access terminal 321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireless communication technologies can be used by the wireless communication devices 305 of FIG. 3. Cellular phones supporting LTE can support packet-switched voice and packet-switched data communications and thus may operate as IMS-compliant mobile devices.

The base transceiver stations 102, 372 can support short-range or long-range wireless access technologies for communicating with wireless communications devices, such as Bluetooth, ZigBee, WiFi, DECT, or cellular communication technologies, just to mention a few. Cellular technologies can include, for example, CDMA-1X, GSM/GPRS, UMTS/HSDPA, TDMA/EDGE, EV/DO, WiMAX, SDR, LTE, as well as other next generation wireless communication technologies as they arise. The base transceiver stations 102, 372 can also be adapted to support circuit-switched wire line access technologies (such as PSTN), packet-switched wire line access technologies (such as TCP/IP, VoIP, etc.), and combinations thereof.

In at least some embodiments, generation of the probe packets disclosed herein and/or recording or otherwise tracking service level outages detected by the techniques disclosed herein can be accomplished using available processing capacity of one or more of the network elements of the hierarchical wireless communications network 100 without interference with their production functionality. For example, a processor in the IP router 104 collocated with the base transceiver station 102 can be used to generate or otherwise originate probe packets disclosed herein. The processor can also implement other aspects of the outage detection processes 200 disclosed herein. In addition, excess storage capacity of the network devices 104, 108 can be used for storing or otherwise recording detected service level outages including their start and time and outage duration. Thus, by using such available processing and storage capacity, the techniques can be implemented without the need for additional hardware, such as shadow routers implementing the probe packets and related techniques disclosed herein.

At least one advantage of the techniques disclosed herein is an ability to detect short duration service level outages in a hierarchical wireless communication network; wherein, the detection can be accomplished at a desired accuracy that can be dependent upon sensitivity to short outages of one or more services delivered by the network. For example, a failure that causes a switchover to a redundant device may result in a relatively brief outage associated with the failover process, but would not necessarily be reported or otherwise accounted for in the existing reliability metrics. Advantageously, the active monitoring disclosed herein will detect and report such outages as they occur.

Another advantage of the techniques disclosed herein is an ability to actively monitor operational status of an aggregation network element from a perspective of a large number of network elements being aggregated, where these elements sends probe packets separated by a relatively large delay asynchronously to the aggregating network element in a such way that the aggregating network element is densely probed while probe packets have no impact on production traffic. The delay between adjacent packets of any particular aggregated network element increases with the number of aggregated network elements.

Yet another advantage of the techniques disclosed herein is an ability to determine the number of base transceiver stations impacted by an outage of aggregation and provider edge routers. Such ability allows for the calculation of enhanced reliability metrics for hierarchical wireless communications networks incorporating weighting of uptime and downtime of each network element by a number of base transceiver stations impacted by an outage of that network element.

Upon reviewing the aforementioned embodiments, it would be evident to an artisan with ordinary skill in the art that said embodiments can be modified, reduced, or enhanced without departing from the scope of the claims described below. For example, other processors can be included within one or more of the network elements where required processing capacity may not be available or otherwise accessible. Such other processor can be configured to implement one or more of the techniques disclosed herein. In at least some embodiments, such other processors can be implemented using spare processing capacity of other devices. Other embodiments can be used in the subject disclosure.

It should be understood that devices described in the exemplary embodiments can be in communication with each other via various wireless and/or wired technologies. The technologies can be links that are described as coupled, connected and so forth, which can include unidirectional and/or bidirectional communication over wireless paths and/or wired paths that utilize one or more of various protocols or technologies, where the coupling and/or connection can be direct (e.g., no intermediate processing device) and/or indirect (e.g., via an intermediary processing device such as a router).

Figure 4:
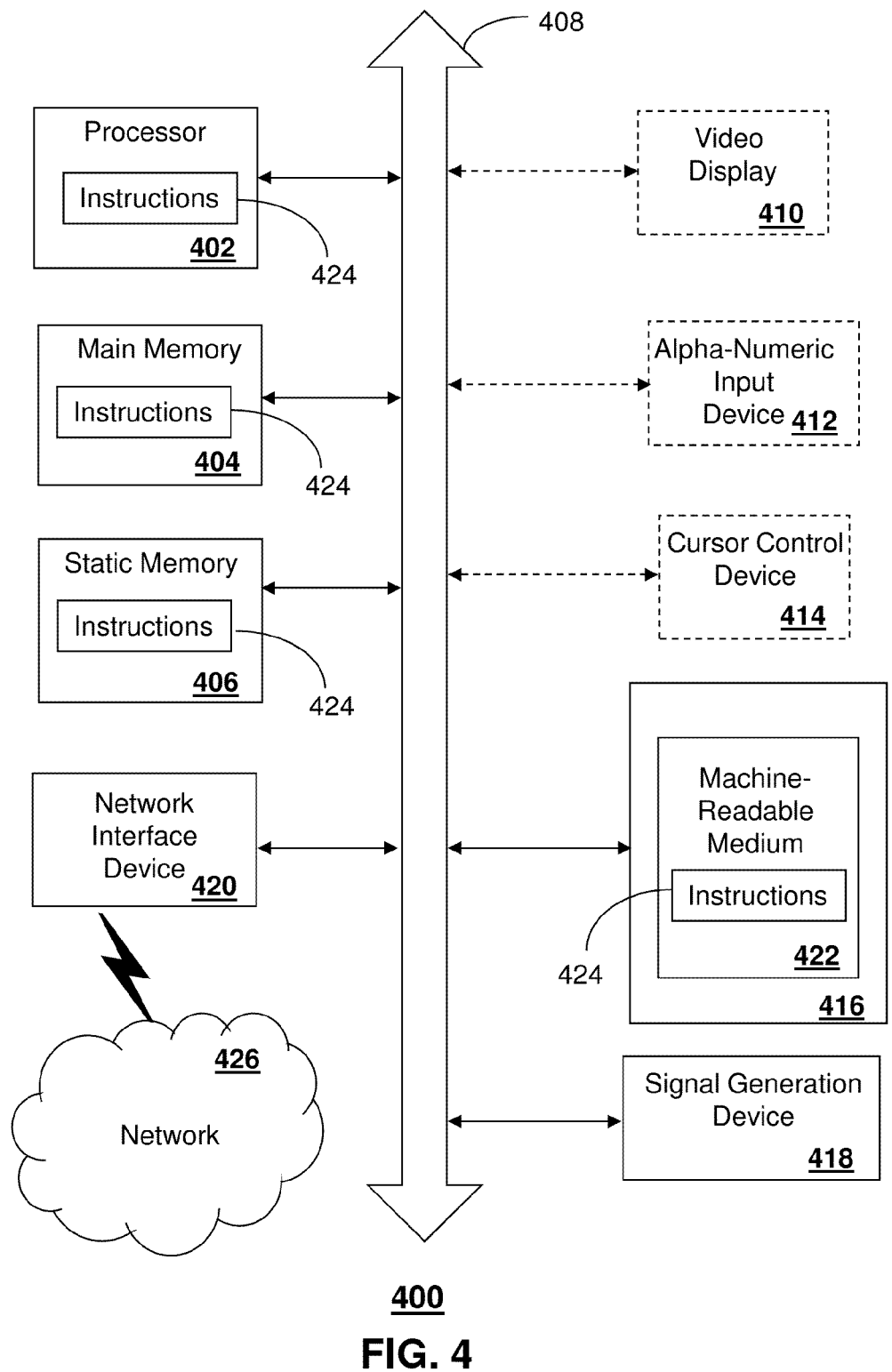
FIG. 4 is a diagrammatic representation of a machine in the form of a computer system within which a set of instructions, when executed, may cause the machine to perform any one or more of the methods described herein.

FIG. 4 depicts an exemplary diagrammatic representation of a machine in the form of a processing system 400 within which a set of computer instructions, when executed, may cause the machine 400 to perform any one or more of the methods describe above. One or more instances of the machine 400 can operate, for example, as the base transceiver station 102, 372, the IP router 104, 374 associated (e.g., collocated) with the base transceiver station, the aggregation IP router 108, 378, the provider edge router 116, 386 the OSS processor 112, or the server 310, the mobile communications device 305 and other devices of FIGS. 1 and 3. In some embodiments, the machine 400 may be connected (e.g., using a network 360, 426) to other machines. In a networked deployment, the machine 400 may operate in the capacity of an autonomous processing system, a server or a client user machine in server-client user network environment, or as a peer machine in a peer-to-peer (or distributed) network environment.

The machine 400 may comprise a server computer, a client user computer, a personal computer (PC), a tablet PC, a smart phone, a laptop computer, a desktop computer, a control system, a network IP router, or any machine capable of executing a set of instructions (sequential or otherwise) that specify actions to be taken by that machine 400. It will be understood that a communication device of the subject disclosure includes broadly any electronic device that provides voice, video or data communication. Further, while a single machine 400 is illustrated, the term "machine" shall also be taken to include any collection of machines that individually or jointly execute a set (or multiple sets) of instructions to perform any one or more of the methods discussed herein.

The processing, or computer system 400 may include a processor (or controller) 402 (e.g., a central processing unit (CPU), a graphics processing unit (GPU, or both), a main memory 404 and a static memory 406, which communicate with each other via an interconnection fabric 408. In some embodiments, the computer system 400 may further include a display unit 410 (shown in phantom, e.g., a liquid crystal display (LCD)), a flat panel, or a solid state display. In some embodiments, the computer system 400 may include an input device 412 (shown in phantom, e.g., a keyboard), a cursor control device 414 (also shown in phantom, e.g., a mouse), a machine-readable storage medium, such as a disk drive unit 416, a signal generation device 418 (e.g., a speaker or remote control) and a network interface device 420. In distributed environments, the embodiments described in the subject disclosure can be adapted to utilize multiple display units 410 controlled by two or more computer systems 400. In this configuration, presentations described by the subject disclosure may in part be shown in a first of the display units 410, while the remaining portion is presented in a second of the display units 410. In network element applications, such as any of the IP routers 104, 374, 108, 378, 116, 386, features such as the video display 410, the input device 412, and the cursor control device 414 may not be included as part of the processing system 400. Such features can be provided, if at all, by way of the network interface 420, for example, allowing for monitoring and/or control of the processing system 400 by way of a remote server or terminal.

The disk drive unit 416 may include a tangible computer-readable storage medium 422 which can store one or more sets of instructions (e.g., software 424) embodying any one or more of the methods or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An Internet Protocol (IP) router comprising:
a memory configured to store computer instructions; and
a processor coupled to the memory, wherein the processor, responsive to executing the computer instructions, performs operations comprising:
receiving network traffic data from a base transceiver station;
forwarding the network traffic data by way of an aggregation IP router, wherein the aggregation IP router receives similar network traffic data from a plurality of other base transceiver stations by way of a plurality of other IP routers;
originating a plurality of probe packets directed to a targeted one of the base transceiver station and the aggregation IP router, wherein each probe packet of the plurality of probe packets has a lower priority than network traffic data so as not to interfere with the forwarding of the network traffic data;
sending the plurality of probe packets to the targeted one of the base transceiver station and the aggregation IP router to determine, by way of an expected reply to each probe packet of the plurality of probe packets, reachability of the targeted one of the base transceiver station and the aggregation IP router;
detecting, for each probe packet of the plurality of probe packets, a respective response or failure of the targeted one of the base transceiver station and the aggregation IP router to provide the expected reply as an indication of reachability;
detecting a change in reachability of the targeted one of the base transceiver station and the aggregation IP router as an indication of a service impacted outage, wherein detecting the change in reachability of the targeted one of the base transceiver station and the aggregation IP router comprises:
determining a respective service impacted outage start time as a time instant of a first failure of the targeted one of the base transceiver station and the aggregation IP router to provide the expected reply after having previously replied;
determining a respective service impacted outage end time as a time instant of a first reply of the targeted one of the base transceiver station and the aggregation IP router after having previously failed to reply; and
calculating for each targeted one of the base transceiver station and the aggregation IP router a respective service impacted outage duration as a difference between the respective service impacted outage end time and the respective service impacted outage start time; and
recording in outage log records, the indication of the service impacted outage for the targeted one of the base transceiver station and the aggregation IP router.

2. The IP router of claim 1, wherein sending the plurality of probe packets comprises sending consecutive probe packets to the targeted one of the base transceiver station and the aggregation IP router, wherein the consecutive probe packets are separated by a delay time.

3. The IP router of claim 2, wherein the delay time is not more than a buffer depth provisioned by a streaming video protocol.

4. The IP router of claim 1, wherein recording in outage log records the indication of the service impacted outage for the targeted one of the base transceiver station and the aggregation IP router further comprises, recording in the outage log records for each indication of a service impacted outage, the service impacted outage start time, the service impacted outage end time, and the service impacted outage duration.

5. The IP router of claim 4, wherein the processor, responsive to executing the computer instructions, performs operations comprising:
receiving from a post processor a request to download the outage log records comprising the indication of the service impacted outage with its respective service impacted outage start and service impacted outage end time and service impacted outage duration; and
downloading the outage log records to the post processor, in response to the request, wherein the post processor determines from the outage log records obtained from all IP routers originating probe packets in a common system, a measure of network reliability for at least a segment of the common system.

6. The IP router of claim 5, wherein the measure of network reliability comprises a generalized uptime, a mean time between outages, or defects per million.

7. A method, comprising:
receiving, by a cell-site Internet Protocol (IP) router comprising a processor, network traffic data from a collocated base transceiver station;
forwarding, by the cell-site IP router, the network traffic data;
generating, by the cell-site IP router, a plurality of probe packets directed to the collocated base transceiver station;
sending, by the cell-site IP router, the plurality of probe packets to the collocated base transceiver station, wherein each probe packet of the plurality of probe packets prompts a respective reply from the collocated base transceiver station, wherein each probe packet of the plurality of probe packets has a lower priority than network traffic data so as not to interfere with the network traffic data;
detecting, by the cell-site IP router, for each probe packet of the plurality of probe packets, a respective response or failure of the collocated base transceiver station to provide an expected reply as an indication of reachability;
detecting, by the cell-site IP router, a change in reachability of the collocated base transceiver station as an indication of a service impacted outage, wherein detecting of the change in reachability comprises:
determining for the base transceiver station a respective service impacted outage start time as a time instant at which a failure to provide the respective reply first occurred after having previously replied;
determining for the base transceiver station a respective service impacted outage end time as a time instant at which a reply first occurred after having previously failed to reply; and
determining a respective service impacted outage duration as a difference between the service impacted outage end time and the service impacted outage start time; and
recording, by the cell-site IP router, in outage log records, the indication of the service impacted outage for the collocated base transceiver station.

8. The method of claim 7, wherein sending, by the cell-site IP router, the plurality of probe packets comprises sending consecutive probe packets to the collocated base transceiver station separated by a delay time not more than a buffer depth provisioned by a streaming video protocol.

9. The method of claim 7, further comprising:
generating, by the cell-site IP router, another plurality of probe packets;
sending, by the cell-site IP router, the another plurality of probe packets to an aggregation IP router receiving another similar plurality of probe packets from each of a plurality of other cell-site IP routers, each collocated with a respective one of a plurality of other base transceiver stations, each of the another plurality of probe packets prompting a respective reply from the aggregation IP router;
detecting, by the cell-site IP router for each probe packet of the another plurality of probe packets, a respective response or failure of the aggregation IP router to provide the respective reply as an indication of reachability and interpreting the indication of reachability as being unreachable as a service impacted outage; and
determining, by the IP router for each respective failure, a corresponding change in reachability of the aggregation IP router.

10. The method of claim 9, wherein sending the plurality of probe packets to the aggregation IP router comprises sending the plurality of probe packets according to a randomly selected timing offset.

11. The method of claim 9, further comprising:
receiving, by the cell-site IP router, a request to forward recorded changes in reachability to a post processor; and
downloading, by the cell-site IP router, the outage log records to a post processor, wherein the post processor receiving outage log records from other cell-site IP routers of a common system determines from the outage log records a measure of network reliability for at least a segment of the common system.

12. The method of claim 11, wherein the measure of network reliability comprises a generalized uptime, a mean time between outages, or defects per million.

13. A computer-readable storage device, comprising computer instructions which, responsive to being executed by an Internet Protocol (IP) router, cause the IP router to perform operations comprising:
receiving network traffic data from a base transceiver station collocated with the IP router;
forwarding the network traffic data by way of an aggregation IP router, wherein the aggregation IP router receives similar network traffic data from a plurality of other IP routers collocated with other base transceiver stations;
generating, by the IP router a set of probe packets, wherein each probe packet of the set of probe packets has a lower priority than network traffic data so as not to interfere with the forwarding of the network traffic data;
sending the set of probe packets to the aggregation IP router, wherein the aggregation IP router receives the set of probe packets and other sets of probe packets from the plurality of other IP routers collocated with the other base transceiver stations, each probe packet of the other sets of probe packets also having a lower priority than network traffic data so as not to interfere with the forwarding of the network traffic data, wherein each probe packet of the set of probe packets and the other sets of probe packets prompts a respective reply from the aggregation IP router;
detecting, for each probe packet of the set of probe packets, a respective response or failure of the aggregation IP router to provide the respective reply as an indication of reachability;

detecting a change in reachability of the aggregation IP router as an indication of a service impacted outage, wherein the detecting of the change in reachability comprises:
- determining for the aggregation IP router a service impacted outage start time as a time instant at which a failure to provide the respective reply first occurred after having previously replied;
- determining for the aggregation IP router a service impacted outage end time as a time instant at which a reply first occurred after having previously failed to reply; and
- determining a respective service impacted outage duration as a difference between the service impacted outage end time and the service impacted outage start time; and recording at the IP router the indication of the service impacted outage in outage log records, wherein indications of service impacted outages are similarly detected and recorded at each IP router of the plurality of other IP routers collocated with the other base transceiver stations.

14. The computer-readable storage device of claim 13, wherein inter-arrival times between consecutive probe packets to the aggregation IP router are separated by a delay that is less than a buffer depth provisioned by a streaming video protocol.

15. The computer-readable storage device of claim 14, wherein sending the set of probe packets to the aggregation IP router comprises sending the set of probe packets according to a randomly selected timing offset.

16. The computer-readable storage device of claim 13, further comprising computer instructions which, responsive to being executed by an IP router, cause the IP router to perform operations comprising:
- creating another set of probe packets directed to the base transceiver station;
- sending the other set of probe packets to the base transceiver station receiving similar network packets from a plurality of other base transceiver stations, each probe packet prompting a respective reply from the base transceiver station;
- detecting, for each of the other set of probe packets, a respective response or failure of the base transceiver station to provide the respective reply as an indication of reachability;
- determining, for each respective indication of reachability being unreachable, a service level outage corresponding change in reachability of the base transceiver station; and
- recording in outage log records, the changes in reachability of the base transceiver station.

17. The computer-readable storage device of claim 16, further comprising computer instructions which, responsive to being executed by an IP router, cause the IP router to perform operations comprising:
- receiving a request to forwarding recorded changes in reachability to a post processor; and
- downloading the outage log records to the post processor in response to the request, wherein the post processor determines from the outage log records a measure of network reliability.

* * * * *